Dec. 31, 1963 L. H. MORIN 3,115,795
BELT SPEED REDUCER EMPLOYING MULTIPLE GROOVE PULLEYS
Filed July 19, 1962
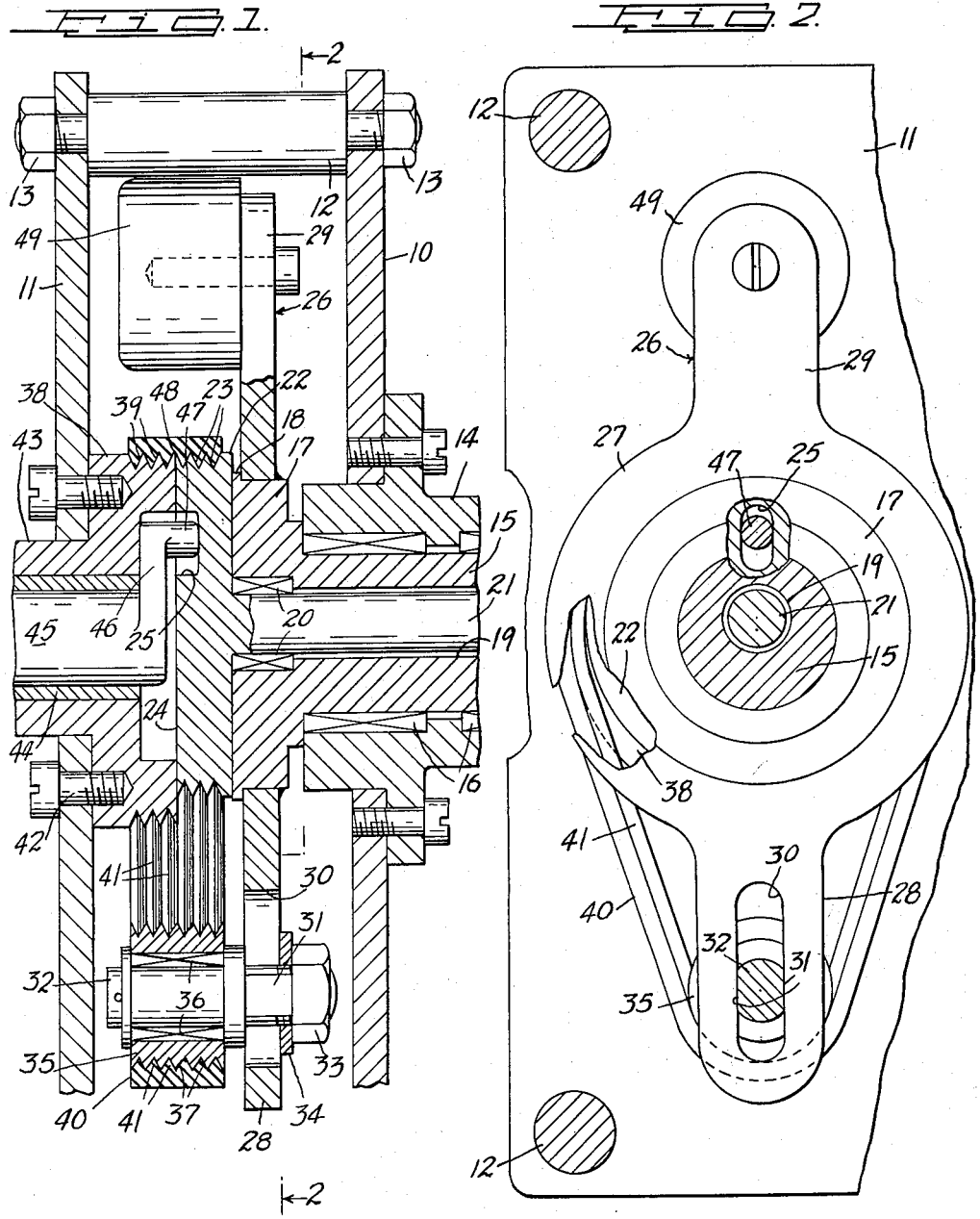
INVENTOR.
LOUIS H. MORIN
BY
Howard C. Thompson
ATTORNEY United States Patent Office 3,115,795
Patented Dec. 31, 1963

3,115,795
BELT SPEED REDUCER EMPLOYING MULTIPLE GROOVE PULLEYS
Louis H. Morin, Bronx, N.Y.
(125 Beechwood Ave., New Rochelle, N.Y.)
Filed July 19, 1962, Ser. No. 211,137
7 Claims. (Cl. 74—797)

This invention relates to speed reducers employing a pair of associated pulleys having multiple grooves therein and a single belt operatively engaging the grooves of both pulleys, as well as a multiple grooved idler pulley in controlling reduction drive between a drive member and a member to be driven. More particularly, the invention deals with a reducer of the character defined, wherein one of the associated pulleys is stationary and the other pulley rotatable in control of the reduction drive of the driven shaft through a crank on the driven shaft operatively engaging said rotatable pulley. Still more particularly, the invention deals with a reducer, including a crossarm directly driven by the drive shaft and, wherein, said crossarm adjustably supports the idler pulley at one end of the arm and the other end of the arm including a counterweight.

The novel features of the invention will be best understood from the following description, when taken together with the accompanying drawing, in which certain embodiments of the invention are disclosed and, in which, the separate parts are designated by suitable reference characters in each of the views and, in which:

FIG. 1 is a diagrammatic sectional view through a speed reducer made according to my invention, with parts of the construction broken away and parts shown in section; and FIG. 2 is a diagrammatic sectional view substantially on the broken line 2—2 of FIG. 1 and with parts of the construction broken away.

This application constitutes a continuation-in-part of my prior application Serial Number 172,313, filed February 9, 1962.

In illustrating one adaptation of my invention, I have shown a reducer comprising two side plates or frames 10 and 11, generally rectangular in form and secured together and spaced apart at corner portions by rods shown, in part, at 12. Considering FIG. 1, it will appear that these rods have reduced threaded ends, upon which nuts 13 are arranged. Mounted in the central portion of the plate 10 and secured to said plate is a flanged bearing 14, in which is rotatably mounted a drive member 15 operating on spaced roller bearings, diagrammatically illustrated, in part, at 16. The bearing 14 projects through the inner surface of the plate 10 and the drive member 15 projects beyond the bearing and has an annular enlarged portion 17, including a projecting annular flange 18.

In the bore 19 of the drive member 15 are spaced roller bearings, one of which is diagrammatically seen at 20, for free support of a shaft 21. The shaft 21 has, at its inner end adjacent the enlarged portion 17, a pulley 22, having multiple annular grooves, generally V-shaped in cross-sectional form, as indicated at 23. The inner surface 24 of the pulley 22 includes a radially arranged slot 25, note FIG. 2 of the drawing.

Suitably fixed to the enlarged portion 17 and abutting the flange 18 is a crossarm 26, comprising a round ring portion 27, note FIG. 2, with oppositely extending arms 28 and 29. The arm 28 has an elongated slot 30 adapted to receive flattened sides 31 of a stud 32, note FIG. 2. One end of the stud 32 is threaded to receive a nut 33, which bears upon a washer 34, as clearly noted in FIG. 1. The other end of the stud has an idler pulley 35 freely rotatable upon roller bearings, as diagrammatically seen at 36.

The idler pulley includes a multiplicity of annular grooves 37, generally V-shaped in cross-sectional form, part of the grooves 37 being in alinement with the grooves 23 of the pulley 22.

At 38 I have shown a pulley associated with the pulley 22 and also having multiple annular grooves 39, the latter being in alinement with part of the grooves 37 in the idler pulley 35. At 40 I have shown a wide belt, having a plurality of ribs 41 on the inner surface thereof, the ribs being spaced transversely of the belt and are adapted to operatively engage the alined grooves 23, 37 and 39, 37 of the rotatable pulley 22, fixed pulley 38 and the idler pulley 35, the pulley 38 being fixed to the wall 11, as by screws 42.

The pulley 38 includes a projecting sleeve portion 43, in which is arranged a bearing 44 for a driven shaft 45 of the speed reducer. By eccentric arrangement of the shaft 21 in the drive member 15, it will appear that the driven shaft 45 is eccentrically disposed with respect to the shaft 21. The inner end of the shaft 45 has a radially extending crank arm 46 having, at its end, a projecting pin 47 operating in the slot 25 of the rotatable pulley 22, as clearly noted in FIG. 1 of the drawing. It will, thus, be apparent that, in reduction drive of the pulley 22, this drive will be transmitted to the driven shaft 45. At this time, it should be pointed out that the variance in diameter of the pulley 22 with respect to the pulley 38 will control the degree of reduction drive of the driven shaft with respect to the drive shaft.

In the construction as shown in FIG. 1 of the drawing, it will appear that the inner surface of the stationary pulley 38 is adjacent the surface 24 of the pulley 22 and the annular ribs of the pulleys which form the respective grooves 23 and 39 will include, at adjacent surfaces of the two pulleys, abutting half-ribs, as seen at the upper portion of the two pulleys at 48 in FIG. 1 of the drawing.

The arm extension 29 of the crossarm 26 supports a counterweight 49 to counterbalance the pulley and associated parts of the arm 28. In rotation of the drive member 15, the crossarm will rotate to move the idler pulley 35, including the belt 40, which is sometimes referred to as a poly-V belt, around the two pulleys 22 and 38 and engagement of the ribs 41 of the belt 40 with the multiple grooves of the two pulleys will result in the reduction drive of the driven shaft 45, depending entirely upon the relative sizes or diameters of the two pulleys 22 and 38.

By engagement of the ribs 41 of the belt 40 with the grooves 23 of the pulley 22 and the grooves 39 of the pulley 38, these pulleys are maintained in alinement.

With the structure as diagrammatically disclosed, it will be understood that, if the drive member is rotated in a clockwise direction as viewed in FIG. 2, then the driven member would be driven in a counter-clockwise direction. It should further be understood that, in some instances, the pulley 22 can be of a larger diameter than the pulley 38, in which event, the driven member 45 will be driven in the same direction as the drive member.

As is known in the art, the closer the diameter of the pulley 22 is to the diameter of the pulley 38, the higher the reduction of drive will be between the drive member and the driven member.

Having fully described my invention, what I claim as new and desire to secure by Letters Patent is:

1. A speed reducer of the character defined comprising a supporting frame having spaced plates, a drive member freely rotatable in one of said plates, a driven member freely rotatable in the other of said plates, a crossarm fixed to the drive member within and between said plates, one end of the crossarm having means adjustably supporting an idler pulley having transversely spaced annular V-grooves, a pulley fixed to the second named plate and in which said driven member is rotatable, said fixed pulley having transversely spaced annular V-grooves, a companion rotatable pulley freely rotatable in said drive member and arranged in abutting surface engagement with said fixed pulley, said rotatable pulley having transversely spaced annular V-grooves, the annular grooves of the fixed pulley and companion rotatable pulley being in alinement with corresponding annular grooves in said idler pulley, a wide belt having transversely spaced ribs extending the full length of the belt, said ribs being V-shaped in cross-sectional form, part of the ribs of said belt operatively engaging the grooves of said fixed pulley, another part of the ribs of said belt operatively engaging grooves of said companion rotatable pulley, said grooves of ribs on the belt operatively engaging grooves of the idler pulley alined with the grooves of said fixed and rotatable pulleys, said rotatable pulley being of a diameter different from the diameter of said fixed pulley, and said rotatable pulley and driven member having interengaging relatively movable means for transmitting the drive of said rotatable pulley to said driven member and the crossarm actuated by said member in rotating the idler pulley within said belt and around said fixed and rotatable pulleys.

2. A speed reducer as defined in claim 1, wherein said last named means comprises a crank portion on the driven member operating in a recessed surface of said rotatable pulley.

3. A speed reducer as defined in claim 1, wherein the first named means includes a stud keyed to and adjustable radially in said crossarm.

4. A speed reducer as defined in claim 3, wherein the opposed end of the crossarm supports a counterweight, and said idler pulley includes a free bearing support on said stud.

5. In speed reducers of the character described employing a drive member and a driven member, means comprising a belt having a plurality of longitudinally continuous transversely spaced ribs operatively engaging a fixed pulley of one diameter, a rotatable pulley of a diameter different from the diameter of said fixed pulley and an idler pulley, said idler pulley being alined with and radially spaced with respect to the first named pulleys, said first named fixed and rotatable pulleys being in abutting engagement and having transversely spaced annular grooves collectively alined with predetermined transversely spaced annular grooves on said idler pulley, interengaging means between the rotatable pulley and said driven member for transmitting drive of the rotatable pulley to said driven member, and means actuated by said drive member for rotating the idler pulley circularly around said fixed and rotatable pulleys and within the belt in the reduction drive of said driven member.

6. A speed reducer as defined in claim 5, wherein said last named means includes means adjustably supporting the idler pulley to maintain tensional engagement of the belt with said first named pulleys and said idler pulley as well as means for counterbalancing said idler pulley.

7. A speed reducer as defined in claim 5, wherein said second named means comprises a crank on said driven member, including a pin portion operating in an elongated slot in said rotatable pulley.

References Cited in the file of this patent

UNITED STATES PATENTS

| | | |
|---|---|---|
| 381,371 | Heller | Apr. 17, 1888 |
| 630,833 | Johnston | Aug. 8, 1899 |
| 2,182,461 | Yeakel | Dec. 5, 1939 |
| 2,472,513 | Bergquist | June 7, 1949 |
| 3,094,884 | Morin | June 25, 1963 |